March 21, 1939.  W. B. RUNK  2,150,987
AUTOMATIC SAFETYPIN MACHINE
Filed May 25, 1936   8 Sheets-Sheet 1

INVENTOR
William B. Runk
BY
Wooster & Davis
ATTORNEYS

March 21, 1939.  W. B. RUNK  2,150,987
AUTOMATIC SAFETYPIN MACHINE
Filed May 25, 1936  8 Sheets-Sheet 2
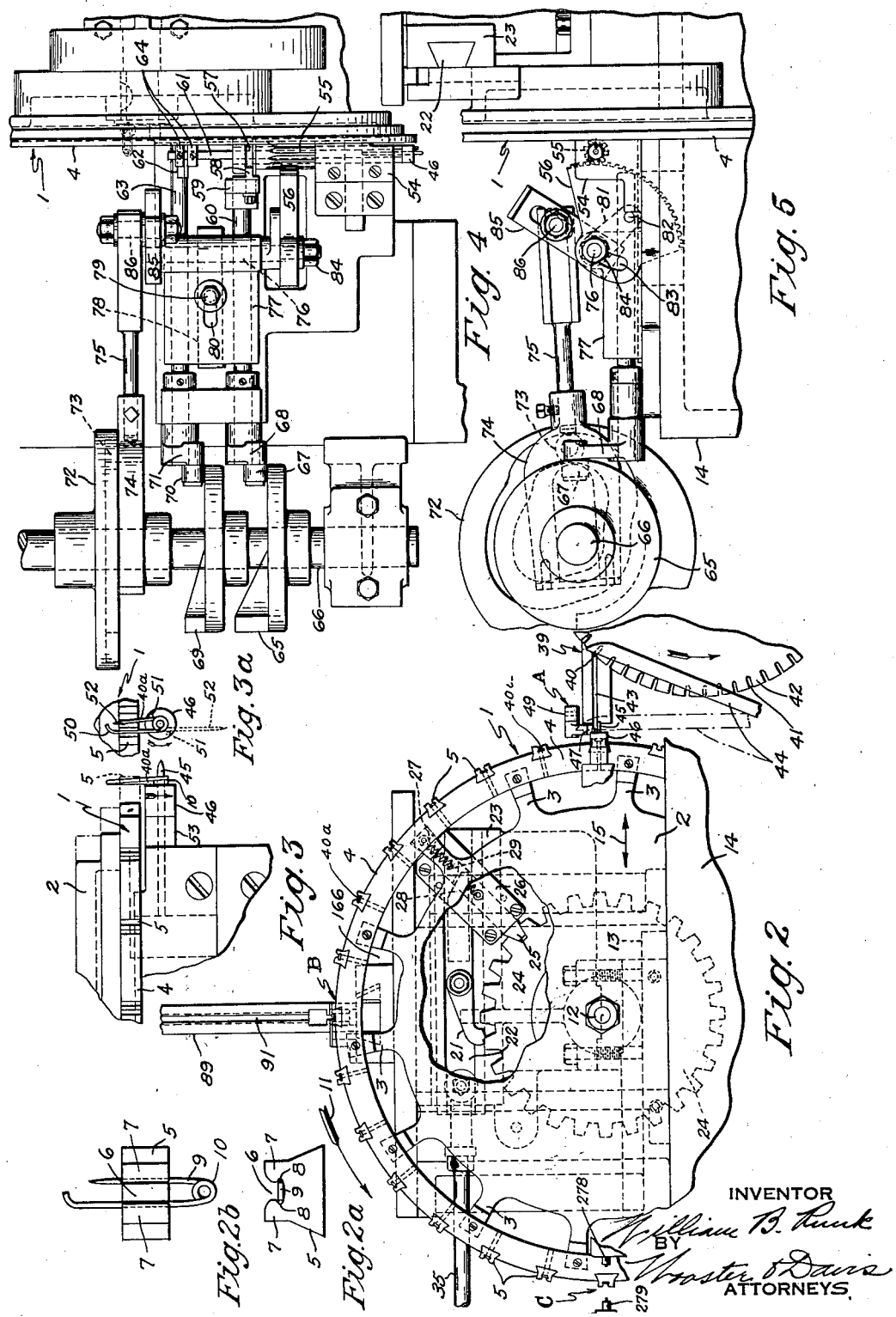
INVENTOR
William B. Runk
BY
Wooster & Davis
ATTORNEYS March 21, 1939.　　　W. B. RUNK　　　2,150,987
AUTOMATIC SAFETYPIN MACHINE
Filed May 25, 1936　　　8 Sheets-Sheet 3

INVENTOR
William B. Runk
BY
Worster & Davis
ATTORNEYS

March 21, 1939. W. B. RUNK 2,150,987
AUTOMATIC SAFETYPIN MACHINE
Filed May 25, 1936 8 Sheets-Sheet 4
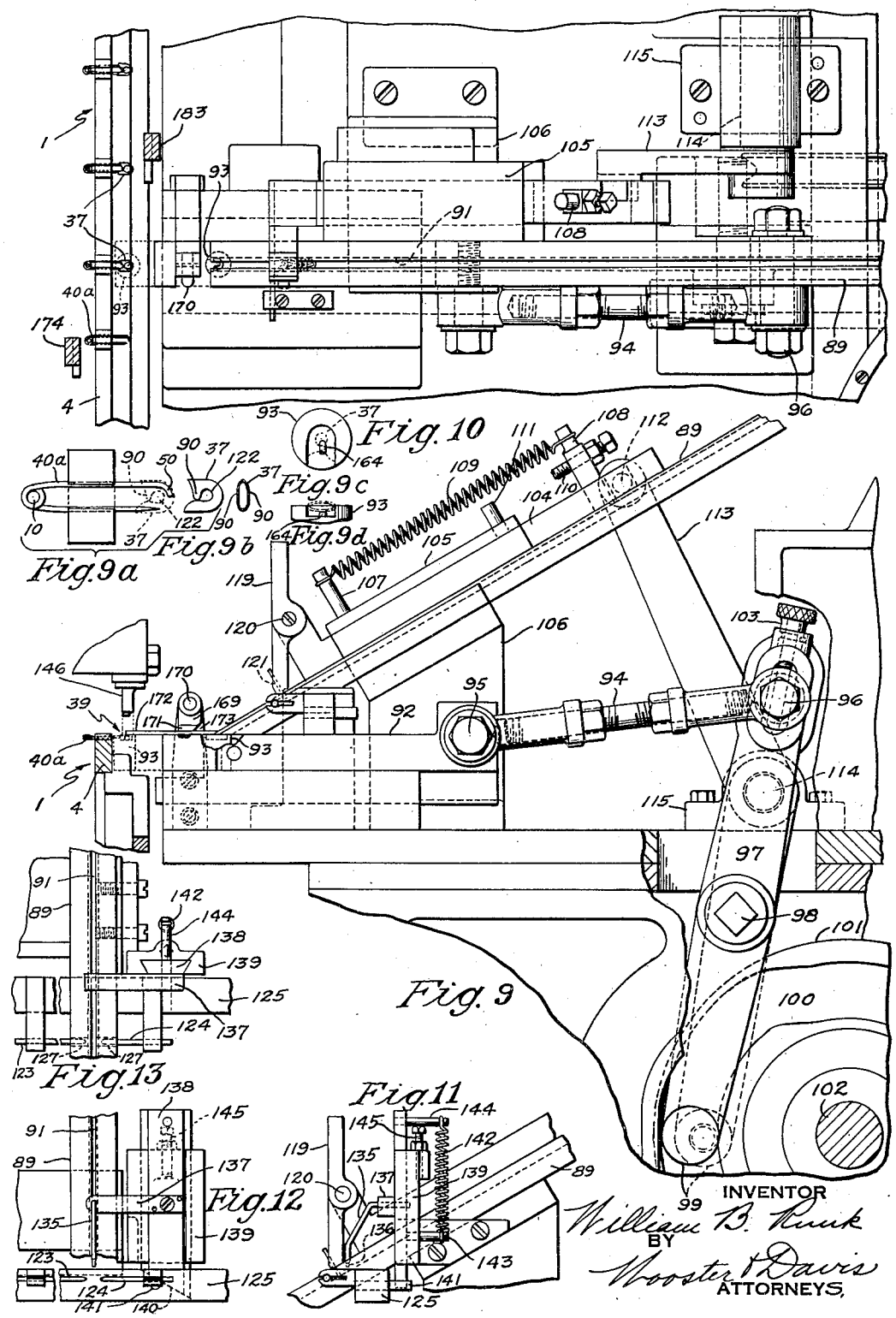

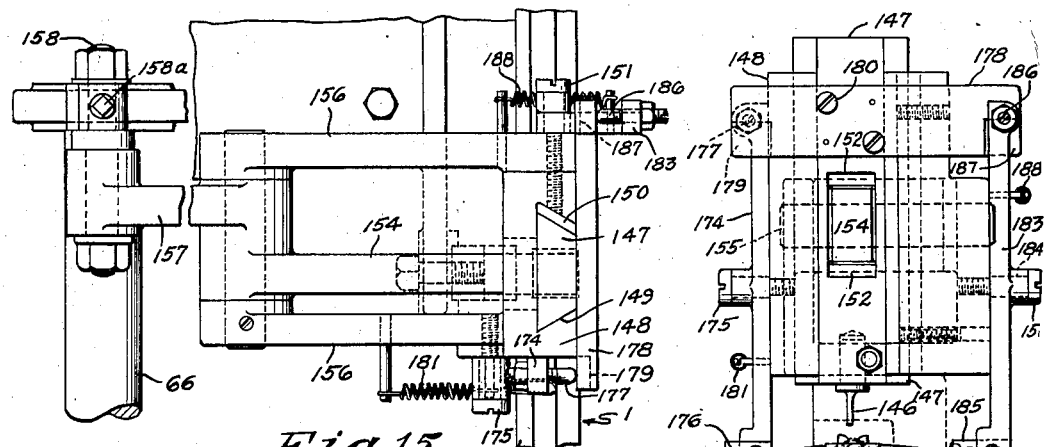
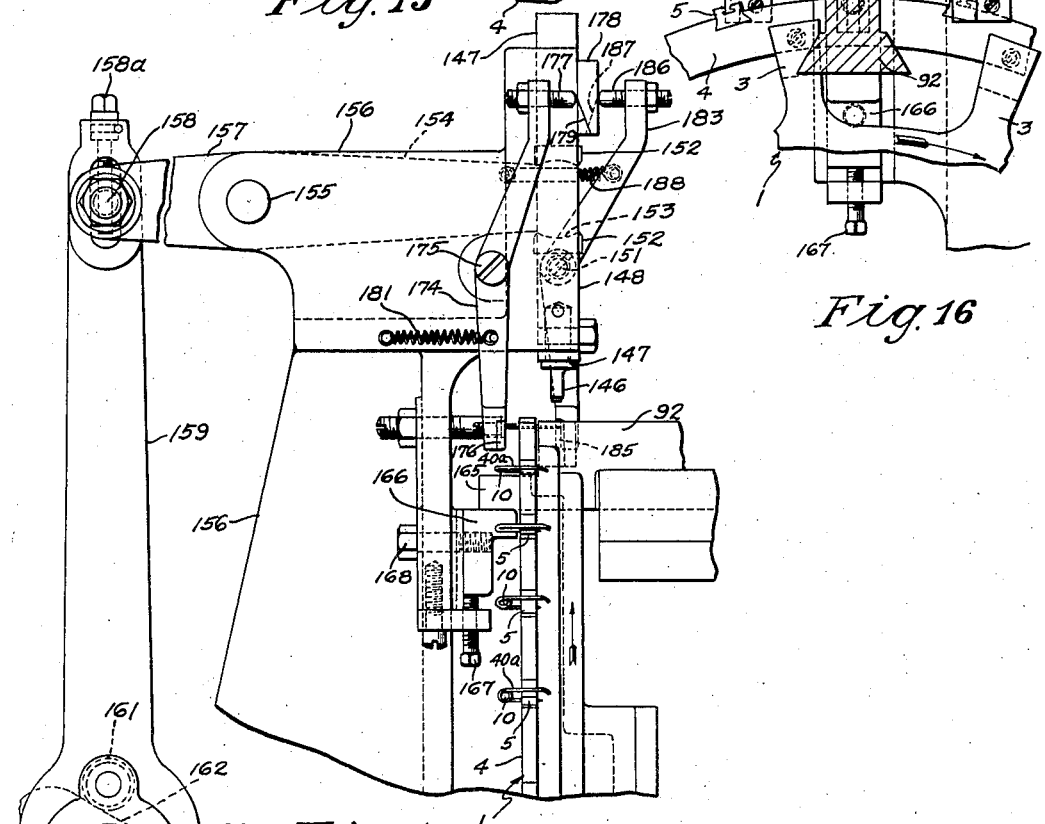

March 21, 1939.  W. B. RUNK  2,150,987
AUTOMATIC SAFETYPIN MACHINE
Filed May 25, 1936  8 Sheets-Sheet 6

INVENTOR
William B. Runk
BY
Wooster & Davis
ATTORNEYS

INVENTOR
William B. Runk
BY
Worster & Davis
ATTORNEYS

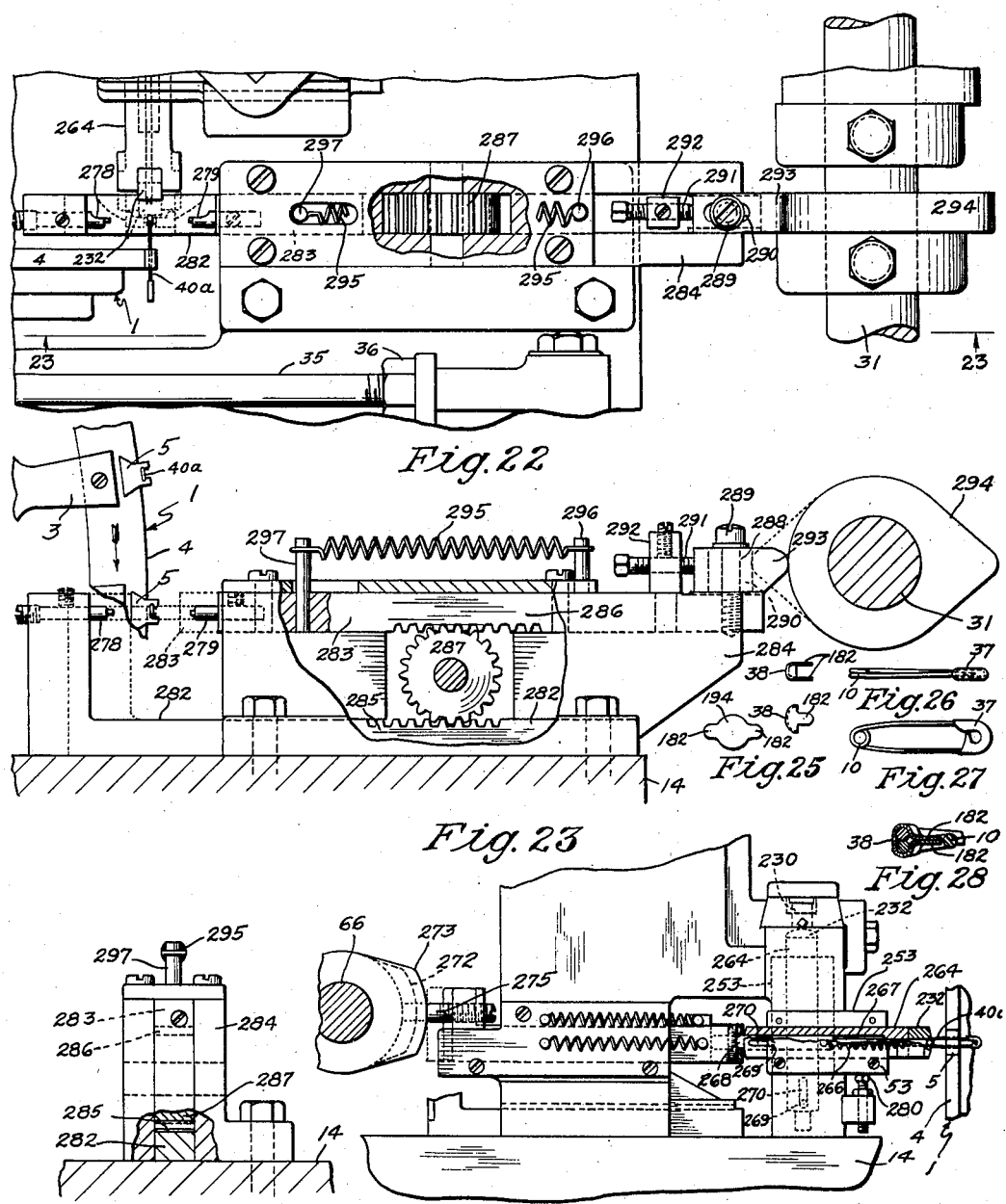

Patented Mar. 21, 1939

2,150,987

UNITED STATES PATENT OFFICE 2,150,987

AUTOMATIC SAFETYPIN MACHINE

William B. Runk, Waterbury, Conn., assignor to The F. Kelly Company, Derby, Conn., a corporation of Connecticut Application May 25, 1936, Serial No. 81,618

28 Claims. (Cl. 163—7)

This invention relates to a machine for making safety pins or similar articles, and has for a particular object to provide an improved carrying device for the pin during the various operations, which will reduce the space required and will facilitate placing in operation the various mechanisms for performing the different operations, so as to give positive reliable operation and decrease failures and thus increase production.

Another object is to provide such a machine which is automatic in its operation, and in which the various mechanisms for performing the various operations of forming and assembling a safety pin are arranged in a substantially square or rectangular arrangement whereby they are compactly arranged to require a minimum of space, and are all easily accessible for inspection, adjustment or repair.

With the foregoing and other objects in view it will become apparent as the description proceeds the invention consists of certain novel features of construction and arrangement of devices as will be more fully disclosed in connection with the accompanying drawings, it being understood that various modifications and arrangements may be employed within the scope of the invention.

In these drawings:

Fig. 2 is a side elevation of the main carrying disc or dial and associated parts, certain elements being broken away to more clearly show the construction;

Fig. 2a is a side elevation of the pin holder carried by the dial;

Fig. 2b is a top plan view thereof;

Fig. 3 is a top plan view of the right hand end portion of the dial showing the pin forming, twisting or winding position;

Fig. 3a is a detail elevation looking from the right of Fig. 3;

Fig. 4 is a top plan view of the winding mechanism for forming the pin loop and the operating means therefor;

Fig. 5 is an elevation looking from the bottom of Fig. 4;

Fig. 9 is a side elevation of a capping and cap feed mechanism, parts being broken away;

Fig. 9a is a detail plan view showing a pin and cap and how the cap is placed on the pin;

Fig. 9b is an end view of the cap looking from the left of Fig. 9a;

Figs. 9c and 9d are a top plan view and front elevation respectively of the cap carrying die;

Fig. 10 is a top plan view of the mechanism of Fig. 9;

Fig. 11 is a side elevation of the escapement or feed control for the caps;

Fig. 12 is a front view thereof looking from the left of Fig. 11;

Fig. 13 is a top plan view thereof;

Fig. 14 is a side elevation of the mechanism for setting the cap and the pin positioning means;

Fig. 15 is a top plan view thereof;

Fig. 16 is a front elevation looking from the right of Fig. 14;

Fig. 21 is a partial elevation and partial section showing the guard transfer device in the position for placing the guard on the looped end of a safety pin;

Fig. 22 is a top plan view of the mechanism for setting the guard with parts broken away;

Fig. 23 is a side elevation thereof with parts broken away, this view being from the opposite side of the dial from Fig. 2;

Fig. 24 is an end view of the slide mechanism of Figs. 22 and 23 looking from the left thereof;

Fig. 25 is a plan view of the guard blank;

Fig. 26 is a side view of the guard and pin separated to indicate how the guard is placed on the pin;

Fig. 27 is a plan view thereof; and

Fig. 28 is a section through the guarded end of the safety pin after the guard is applied.

*Pin carrier dial*

As a basic feature of this device the safety pins are assembled in an upright dial which is indexed by being rotated with a step by step movement about a horizontal axis to carry the pins to different working stations where different operations are performed, such as applying and setting the cap and guard, and the operations of placing the pin in the dial are facilitated by bodily shifting of the dial in the plane of the dial. The various devices for performing the various operations are located about this dial.

Figure 7:
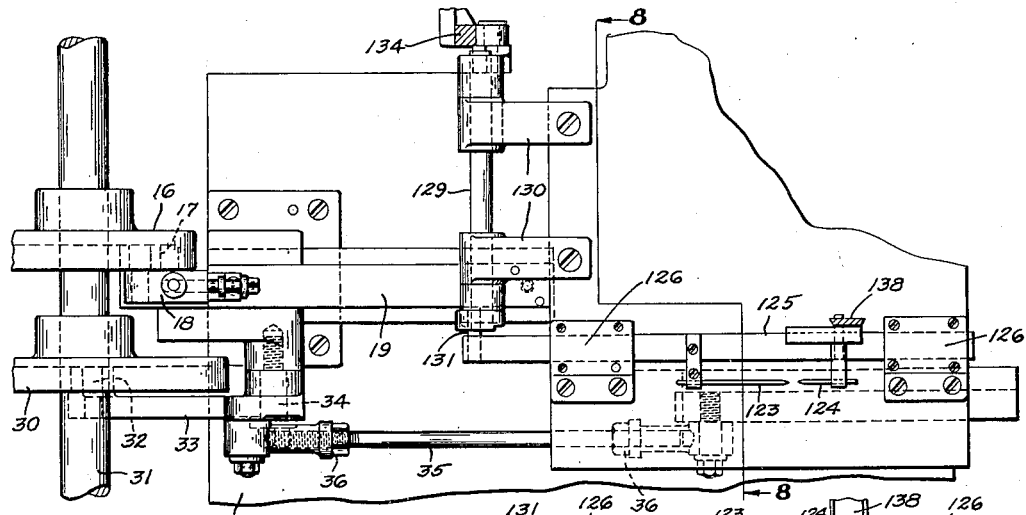
Fig. 7 is a top plan view thereof.

The dial is indicated at 1 and may be in one piece, but preferably comprises a central body portion 2 having spaced peripheral arms 3 to which an annular ring 4 is secured. The ring 4 has undercut or dovetail transverse slots in its outer edge in which are mounted the work holders such as safety pin holders 5. These holders as will be seen from Fig. 2a are tapered at their lower portions to fit the dovetail slots in the dial ring 4, and it also has a transverse recess 6 in its outer wall with overhanging side portions 7 forming undercut transverse grooves 8 to receive the side bars of the pin 9 and thus hold the pin in a position extending transversely of the dial with the connecting loop 10 on one side and with the ends of the pin bars to which the cap is applied, and one of which is pointed, located on the opposite side of the dial. During the operation of the machine, for permitting the various operations of twisting or winding the pin bar or wire to form the loop 10 and the operations of applying and setting the cap and guard, the dial is rotated counterclockwise by a step by step movement as viewed in Figs. 1 and 6 and as indicated by the arrow 11, but clockwise as viewed in Fig. 23 as this view is from the opposite side of the dial. Each step of this movement is sufficient to carry each holder 5 a distance equal to the peripheral distance between the adjacent holders on the edge of the dial. The dial is mounted on a shaft 12 to rotate in suitable bearings on a slide 13 mounted in suitable guideways on the bed 14 of the machine so that the entire disc may be shifted horizontally the given amount back and forth as indicated by the double arrow 15 in Figs. 2 and 6. This dial is shifted in certain timed relation with the various operations on the pin by means of an internal cam 16 (Figs. 1 and 7) by means of a roller 17 running in this cam groove and carried by a block 18 on the sliding connecting bar 19 and connected to the slide 13 as indicated at 20. Suitable adjusting mechanism is provided to adjust the position of the block 18 and therefore properly locate the dial in its different movements.

The dial in addition to its bodily transverse movement with the slide 13 has a rotary step by step indexing movement which is affected by a pivoted pawl 21 carried by a sliding bar 22. This bar is mounted to slide in a guide 23 carried by slide 13, this bar being in the present instance of general dovetail or V-shape as indicated in Fig. 5, and the guide 23 has a similar shaped guideway for this bar. This pawl 21 engages the teeth of the ratchet 24 secured to the dial 1 or shaft 12 so as to move with the dial. The number of teeth in this ratchet corresponds with the number of pin holders 5 carried in the periphery of the dial, and therefore a movement of the ratchet corresponding to the spacing of these teeth will turn the dial a distance corresponding to the spacing of the pin holders. The dial is held in different rotary positions by means of a locking pawl 25 adapted to seat in the notch or space between adjacent teeth of the ratchet, this pawl being mounted to slide in a suitable guide 26 and is held in locking position by means of a spring 27 urging it toward the ratchet. The sliding bar 22 carries an inclined cam 28 adapted to engage a shoulder 29 on the locking pawl to shift this pawl outwardly and remove it from the ratchet to thus unlock the ratchet and dial and permit the dial to be turned one step. That is, when the bar 22 is shifted to the right as viewed in Fig. 6 the cam 28 engages the shoulder 29 to lift the locking pawl 25 from the ratchet to unlock it. At the same time the pawl 21 is carried to the right to the next tooth on the ratchet. As the bar 22 is moved back or to the left the pawl 21 turns the ratchet to the left or counterclockwise and with it the dial 1. This movement also releases the locking pawl 25 which moves into the next notch between the teeth on the ratchet and thus positions the dial and the pin holders 5 in their next advanced position and locks them in this position, so that the safety pins are accurately located for the various operations to be performed on them. The bar 22 is shifted in the desired timed relation with the operations of the other mechanism by means of a cam 30 on the shaft 31 having a cam groove in which the roller 32 runs. This roller is carried on one arm of the bell crank lever 33 pivoted at 34, the other arm being connected to the bar 22 by a connecting rod 35. Preferably means 36 is provided for adjusting the length of this connecting rod to properly locate the cam and ratchet bar 22.

Located about the dial 1 are the various working stations for performing the different operations of completing the pin. In the present case there are three of these stations. These three stations are indicated in Fig. 2, the first station (A) being the station where the already pointed pin bar is twisted or wound to form the loop 10 (Fig. 2b) and the formed bar placed in the holder 5 as shown in Figs. 2a and 2b. The next station (B) is at the top of the dial and is where the cap or shield 37 indicated in Fig. 9a is placed on the free ends of the pin bars and set, and the third station (C) is where the guard 38 (Figs. 25 to 28) is formed and mounted on the loop 10. This completes the safety pin, and after it leaves this station (C) it may be removed from the holder in the dial by any suitable throwout mechanism such as a cam adjacent the side of the dial located in the path of movement of the pin.

*Pin twisting or winding mechanism*

At station (A) is located the mechanism for twisting or winding the pin bar to form the loop 10 and to place this formed bar in a holder 5 on the dial 1. Before the pin bar comes to this position a length of a coil of wire is straightened, cut off to proper length and one end pointed to form the point of the pin by a mechanism which is well known and for that reason is not shown on the drawings in detail, although it forms a component part of this machine and is driven in a certain timed relation with the other mechanism of this machine and from the same main driving mechanism. One end of the bar is pointed by passing it over one or more files and rotating it while in contact with these files. The outlet or delivery end of this straightening or pointing mechanism is shown at 39 at the right hand sides of Figs. 1 and 2. A pin bar with one end pointed is shown at 40 and is delivered by the pointing mechanism into one of a series of notches 41 in rotating discs 42 by which the pointed bars are carried successively into the guides 43 which support the bar by guiding the two opposite ends of the pin.

Pivoted below these guides and between them are arms 44 which are operated in suitable timed relation with the other mechanism by devices not shown to swing back and forth as indicated in Fig. 2 to carry these pointed bars along the guides 43 from the discs 42 to the winding position. As the wire comes to this position it is carried over a central pin 45 in a winding head 46 and at the same time the unsharpened end of the bar is gripped by a clamp or jaw 47 operated from a suitable cam 48 through the connection 49. This grips and holds the unsharpened end of the pin and also bends it down at an angle as indicated at 50 (Figs. 2b and 3a). The bar now rests against the end of the winder head 46 on which is a stud of shoulder 51 (Figs. 3 and 3a), and this head is rotated to the left or counterclockwise as viewed in Fig. 3a to carry the pin or shoulder 51 indicated in dotted lines against the dotted line portion of the pin bar and wind it around the pin 45 to the full line position of Fig. 3a, it being wound one and a half times about this pin to bring the free end portion 52 of the safety pin to the position shown in full lines (Fig. 3a). As this position is reached the pin dial 1 is advanced to the right as indicated by the dot and dash lines (Fig. 3) to carry a holder 5 to a position so that its transverse grooves 8 are in the plane of the bars of the safety pin. In other words as the pin is held stationary in position the holder 5 is advanced so that the pin in effect passes through the slot 6 into the holder. While in this position the driving mechanism for the winding head 46 (presently to be described) turns this head backwardly and thus releases the bar 52 of the pin, and at the same time the clamp 47 is released so that the two bars of the pin tend to separate due to the resiliency of the wire, and therefore the two bars seat in the grooves 8 of the holder 5 and the pin is held thereby as indicated in Figs. 2a and 2b. At the same time the winder pin 45 is retracted from the loop 10 and the winder head 46 is also retracted by a mechanism presently to be described so that the wound safety pin is released from the winding mechanism and the dial 1 may be rotated to carry it away from this winding mechanism to permit the winding of the next succeeding pin bar.

*Mechanism for operating the pin bar winder or twisting means*

The mechanism for winding or twisting the pin bar is shown in Figs. 1, 3, 4 and 5. The winder head 46 is mounted on a shaft 53 mounted to rotate and also slide longitudinally in a bracket 54. Secured to this shaft so as to rotate it is an elongated pinion 55 meshing with a gear segment 56. The pinion 55 has a grooved head 57 in which a rib 58 of a block carried by lever arm 59 on shaft 60 is located. By operation of this arm the pinion 55 with the shaft 53 and the winder head 46 may be shifted longitudinally to and from the winding position. The winder pin 45 is mounted on a rod 61 slidable longitudinally within the shaft 53 and is operated by a lug 62 on a shaft 63 extending between a pair of blocks 64 secured to the rod 61 so that operation of the shaft 63 slides the rod 61 and the pin 45 longitudinally in the shaft 53. The shaft 60 is operated to shift the winder head at the proper time by means of a cam 65 on a shaft 66 through a roller 67 running on this cam and carried by an arm 68 secured to the shaft. The shaft 63 is operated by a cam 69 through a roller 70 on an arm 71 secured to this shaft. The winder head 46 is rotated at the proper time to impart the twist and form the loop 10 in the pin bar by means of the segmental gear 56 meshing with the pinion 55. As the pinion 55 is elongated it can be shifted longitudinally with the shaft 53 and the winder head 46 while still remaining in mesh with the segmental gear 56. The gear 56 is operated from a cam 72 on the shaft 66, this cam having a cam groove in which a roller 73 on the forked head 74 operates to reciprocate the connecting rod 75.

The gear segment 56 is mounted on a shaft 76 supported in suitable bearings in the bracket 77 which is mounted for a certain amount of adjustment toward and from the dial 1 for properly locating the various elements, it being guided by a rib 78 on the base running in a groove in the bottom of the bracket and held in adjusted position by clamping screw 79 extending through an elongated slot 80. Secured to the shaft 76 is an arm 81 carrying a pivot pin 82 extending into the segment 56. The segment has a curved slot 83 struck wth this pin as a center and embracing the shaft 76, on the end of which is a clamping nut 84. By loosening this nut the angular position of the gear segment 56 may be adjusted about the pivot 82 and then clamped in adjusted position by the nut 84. The connecting rod 75 is connected to the shaft 76 by means of an arm 85 connected to the shaft, the rod being connected to the arm at 86.

By means of this mechanism the winding head 46 and the winder pin 45 are advanced to the winding position and the head is rotated at the proper time by the gear segment 56 to wind the pin bar about the pin 45 and then after the dial 1 is advanced by bodily shifting it forwardly to bring one of the holders 5 to the dotted line position of Fig. 3 the cam 72 reverses the movement of the gear 56 to thus rotate the head 46 backwardly a short distance to release the wound pin in the holder 5. Then the pin 45 is retracted from the loop 10 of the safety pin and the head 46 is retracted away from the wound pin by the cams 69 and 65 to thus release the wound pin bar 40a (Fig. 3) and permit it to be carried with the dial 1 on the next step by step movement of this dial.

*Capping mechanism*

The next operation is to apply the caps 37 (Fig. 9a) to the pin 40a. This is done at the station (B) in the present arrangement located at the top of the dial 1, and it will be understood that on every step by step movement of the dial a holder 5 carrying one of the wound pin bars 40a is carried to position (B). The caps 37 are blanked and formed in a separate machine and are placed in a hopper 87 which comprises a rotatable dial or holder having certain guide ribs 88 to position the caps in the correct position to enter an inclined chute 89 leading to the capping position B. The details of this hopper are not shown as they form no part of the present invention. The caps however are positioned by the hopper so that they enter the inclined chute 89 with the open end downwardly and forwardly as indicated in Fig. 9a so that it can be slipped on to the free ends of the wound safety pin bar 40a. It is also so arranged that two lugs 90 on one side of the cap are on opposite sides of the bar of the safety pin which is not pointed and has the inclined end 50, so that as these lugs or ears 90 are bent around this bar the cap is secured thereto and the pointed end of the pin is enclosed in the other side of the cap. This chute 90 therefore has a guiding groove 91 therein of such size and shape as to hold the caps in this position as they travel down the chute as indicated in Fig. 10. The caps therefore travel down this groove in the chute under the force of gravity, and the hopper keeps the chute filled with these caps so that there is always a cap in position to be applied to the free ends of the wound safety pin bars as they are brought to the capping position (B) by the step by step rotative movement of the dial 1. Means however must be provided to control the caps so that they pass from the chute one at a time and in certain timed relation with the mechanism for applying them to the safety pin bar and the mechanism for setting them or fastening them on this bar. This mechanism is shown more clearly in Figs. 6 to 16 inclusive.

At the lower end of the chute 89 is a carrier slide 92 which has a die or holder 93 in its upper surface to receive the cap from the chute and carry it to and place it over the free ends of the bars of the safety pins as indicated in dotted lines Fig. 9a, and also as indicated in the dotted lines Figs. 9 and 10. The top of the slide 92 forwardly of this die or holder is cut away so as to slide under the projecting end portion of the safety pin to permit the positioning of the cap 37 on this pin. It also holds the cap while the lugs 90 thereof are being set or folded around the unpointed bar of the safety pin to secure the cap thereto. This carrier slide 92 is reciprocated back and forth to carry the cap from the chute to the capping position by means of a connecting rod 94 connected to the slide at 95 and adjustably connected at 96 to a lever 97 pivoted at 98 and carrying a roller 99 running in a cam groove 100 in a cam 101 mounted on the shaft 102. The position of connection 96 in the lever 97 may be adjusted by the adjusting mechanism 103 to vary the throw of the slide 92, and the length of the connecting rod 94 is adjustable to vary the position of the slide.

A positive feed is provided to place the shields or caps 37 in the die 93 one at a time and at the proper time. Mounted at one side of the chute 89 is a slide 104 mounted to slide in a suitable guideway 105 carried by a bracket 106. A stud 107 is carried by the guide and another stud 108 is secured to the slide. These are connected by a spring 109 which therefore tends to urge the slide 104 downwardly and forwardly toward the dial 1, the guide 105 being inclined to correspond with the inclination of the chute 89 so that the slide moves substantially parallel to this chute. Forward movement of the slide is limited by an adjustable stop screw 110 engaging a stop 111 on the guide. The slide is connected at 112 to the arm 113 on a shaft 114 mounted in a suitable bearing 115. To the other end of this shaft is secured an arm 116 (Fig. 1) carrying a roller 117 running on a cam 118 on the shaft 102. This cam serves to move the slide 104 to the right or its upper retracted position as view in Fig. 9 at the proper time, and also to permit its movement downwardly or forwardly to the left under the action of the spring 109.

Carried on the forward end of the slide 104 is a carrier lever 119 pivoted to the slide 104 at 120 and carrying at its lower end a feed pin 121. This lever is normally in the upright position and a stop prevents it moving further in a counterclockwise direction. It is however movable in a clockwise direction as viewed in Fig. 9 so that it may pass over the closed end of the cap 37 it has carried into the die 93. When the slide 104 is withdrawn or retracted the lower end of this pin 121 seats in the eye 122 (Fig. 9a) of the cap, and when the slide 104 is advanced it carries the cap downwardly and forwardly to place it in the die 93. There is thus a positive feed of the cap into the die. The cap must however be properly positioned to receive the pin 121 and also an escapement is provided to prevent more than one cap being carried forwardly at a time. The escapement comprises a pair of pins 123 and 124 carried by a slide 125 mounted in guides 126 at opposite sides of the chute 89. The ends of these pins extend into a transverse opening 127 in the chute 89 in the plane of the groove or guide 91 for the caps. It will therefore be seen if one of these pins extends across this groove no cap may pass it. The ends of the pins however are spaced so that as the slide 125 is shifted back and forth, first one pin 123 and then the other 124 is extended across the groove 91 to arrest movement of the caps in the chute, but when both pins are on opposite sides of the groove or cap guide, as shown in Figs. 12 and 13, a cap may be carried forwardly past the pins by the carrier 121. The slide 125 is operated by a lever arm 128 secured to a shaft 129 carried by suitable brackets 130, the arm being connected to the slide 125 at 131. The shaft 129 also carries another arm 132 carrying a roller 133 running on a cam 134 on the shaft 102.

Means is also provided just above the feed 121 to hold the individual caps in proper position one at a time. This comprises a spring pin 135 having a reduced lower end 136 to extend in the open side of the slot in the top of the chute and engage the lowermost cap. This pin is carried by an arm 137 secured to a vertically moving slide 138 mounted in a suitable guide 139, the lower end of this slide being inclined as indicated at 140 (Fig. 12) to form a cam operating on a pin 141 carried by the slide 125, so that on each movement of the slide 125 to the right it raises the slide 138 and the pin 135 to release the cap held thereby and permit the next cap to move to position under the pin. A spring 142 is connected at one end to a stud 143 mounted on guide 139 and at the other end to a stud 144 carried by the slide 138, so that the spring 142 tends to move the slide 138 and the pin 135 downwardly to press the pin against a cap in the chute. Downward movement is limited by an adjustable stop 145 under the stud 144. The slide 138 is of dovetail cross section as shown in Fig. 13 so that it has inclined side edges to be held in the overhanging similarly inclined sidewalls of the guide 139.

It will now be seen that after the dial 1 has been rotated with a step by step movement to bring one of the wound safety pin bars carried by holder 5 into alignment with the chute 89, the slide 92 carrying the die 93 in which a cap 37 is seated is shifted forwardly to place this cap over the free ends of the bar of the safety pin 40a, as indicated in dotted lines Fig. 9a. This is also the dotted line position of Figs. 9 and 10 which is the extreme forward position of the slide 92, the full line position of this slide in Figs. 9 and 10 being the retracted position. When the die and cap are in the forward or dotted line position they are directly under a vertically movable punch 146 carried by a vertically movable slide 147 mounted in a suitable guideway in the head 148. This slide 147 has tapered side walls 149 running under similarly inclined overhanging walls of the guide, there being an adjustable guide plate 150 at one side to take up slack or looseness in the guide, this being adjustable by screw 151. This slide has a recess carrying bearings 152 for the rounded head 153 on one arm of a bell crank lever 154 pivoted at 155 in a bracket 156. The other arm 157 of this lever is adjustably connected at 158 to a lever 159 having a fork 160 at one end embracing the shaft 66 and carrying a roller 161 running on a cam 162 mounted on said shaft. The connection 158 is a pin and slot connection which may be adjusted by a suitable adjusting screw 158a to vary the relative position of the punch 146.

It will be seen that after this cap 37 is carried to the dotted line position of Figs. 9 and 10 and placed on the end of a wound safety pin bar, this punch comes down and presses down the upper lug 99 of the cap around the unpointed bar 50 of the pin, and the die 93 has a lug 164 (Figs. 9c and 9d) in alignment with this punch to press upwardly the lower lug 90 and wrap it around the bar of the pin, so that the cap is now fastened on the pin. As the free end of the slide 92 is overhanging its guide and must take the blow of the punch 146 means is preferably provided for supporting this free end of the slide as shown in Fig. 14. In this figure the forward end portion of slide 92 is shown in full lines in the advanced or forward position corresponding to the dotted line position of Figs. 9 and 10. Projecting from the lower portion of the slide 92 at its free end is an extension 165 which passes through the space 166 (Fig. 2) between the arms of the dial center portion 2 and below the annular ring member 4, and slides over the top of an anvil 166 providing a support for the free end of the slide 92 while it is in this position and will take the blow of the punch. The anvil 166 is mounted on the bracket 156 as will be seen in Fig. 14, and it is vertically adjustable thereon so that it may be properly located. This adjustment includes an adjusting screw 167 and a clamping screw 168 tapped into the anvil and extending through an elongated opening in the bracket.

It will now be seen that the cap 37 is properly set on the safety pin. The carrier 92 together with the die 93 is withdrawn from this position, shown in full lines Fig. 14 to the full line positions of Figs. 9 and 10 before the next step by step turning movement of the pin carrying dial 1. After this slide 92 has been retracted the dial 1 is indexed to bring the next pin into position to receive the next cap 37. Means is provided to throw out the cap from the die 93 in case it should not be properly set on the safety pin and should be carried back with the die 93. This comprises a small pawl 169 (Fig. 9) pivoted above the slide 92 at 170 and having a narrowed lower end projection 171 extending through a slot in a plate 172 over the path of movement of the die 93. This pawl 169 may swing to the left as viewed in Fig. 9 but is held against movement to the right by engagement with the edge of the slot. The right hand edge of this rib or projection 171 is inclined at 173 to permit the die and cap to pass forwardly or to the left as viewed in Fig. 9 to position the cap under the punch 146, but should the cap not be properly set but should be carried back with the die 93 the forward edge of this pawl 171 will catch the cap and throw it out of the die.

*Means for positioning safety pins in their holders*

As the wound safety pin bars are carried upwardly from the position A to the position B for setting the cap 37 thereon they pass by means for automatically so positioning them in their holders 5 that the free ends 50 and the point of the safety pin bars are located in proper position to receive the cap 37. This device is shown in Figs. 14, 15 and 16 and comprises a lever 174 pivoted to the bracket 156 at 175. The lower end of this lever carries a block or plate 176 which is at the side of the pin carrying dial 1 and in such position that it may engage the looped ends 10 of the pin 40a in the next position before it reaches the capping position under the punch 146. The upper end of the lever 174 carries an adjustable stud 177 engaging one side of a cam plate 178, the lower portion of this cam plate having an inclined cam 179. This cam plate 178 is fastened to the vertically movable slide 147 carrying the punch 146 so as to move up and down with the slide, the plate being secured to this slide by any suitable means such as the screws 180. As this slide 148 moves downwardly to operate the punch 146 it carries with it the cam plate 178, causing the cam 179 to operate on the end of a stud 177 to throw the upper end of the lever 174 backwardly or to the position of Fig. 14, which carries the block 176 at the lower end of the lever 174 into engagement with the projecting wound end 10 of the safety pin bar in the next forward position, which is as shown in Fig. 16, and pushes this pin forwardly a short distance in its holder 5. It will therefore be seen that with this device each safety pin is pushed forwardly in its holder 5 a short distance before it is carried to the capping position B, and therefore each and every safety pin is located in the same position in its holder 5 as it is carried into the capping position B, thus insuring that the end to receive the cap is projected just the proper distance to receive this cap. The lever 174 is retracted away from the pin when the slide 147 and plate 178 is raised after setting the cap. This is done by a spring 181 secured to the lever and the bracket 156 and holding the end of the stud 177 against the cam plate.

After the capped pin leaves the capping position B it is carried by the indexing operation of the dial 1 to the guarding position C, Fig. 2, where a small guard 38 (Figs. 25 and 28) having securing lugs 182 is placed over the wound or looped end 10 of the safety pin to provide a guard to prevent it catching on different articles in use. This guard however, as will be seen, is applied to the safety pin on the opposite side of the pin carrying the dial 1 from the side on which the cap 37 is applied. As the safety pins are carried forwardly by this dial from the capping position B they are each properly located in their holders 5 so as to place the loop 10 in proper position to receive the guard. This is done by mechanism similar to that for locating the pins just before they reach the capping position B. This is also shown in Figs. 14, 15 and 16 and comprises a lever 183 on the opposite side of the bracket 156 from the lever 174, this lever being pivoted to the bracket at 184. At its lower end it carries a block or plate 185 similar to the block 176, but facing in the opposite direction, and this block is on the opposite side of the dial 1 from the block 176. At its upper end the lever 183 carries an adjustable stud 186 engaging the opposite side of the cam plate 178 from that of the stud 177, and this side of the plate is provided with an inclined cam 187 in alignment with the stud. This stud is held against the cam plate by a spring 188 connected at its opposite ends to the lever 183 and the bracket 156. The plate 185 as seen in Fig. 16 is located opposite the capped end of the safety pin in the next position after it leaves the capping position under the punch 146, and as the punch comes down with the slide 147 to set the next succeeding cap the cam plate 178 is carried down with it, and the cam 187 acting on the stud 186 throws the upper end of the lever 183 outwardly to carry the plate 185 against the capped end of the safety pin and push this pin backwardly a short distance in its holder 5. As each pin is so pushed back by the plate 185 it will be seen they are all automatically placed in the proper position in their holders before they reach the guarding position C, and thus when they reach this position the loop 10 of each pin is properly and accurately positioned to receive the guard 38.

*Guarding mechanism*

Figure 1:
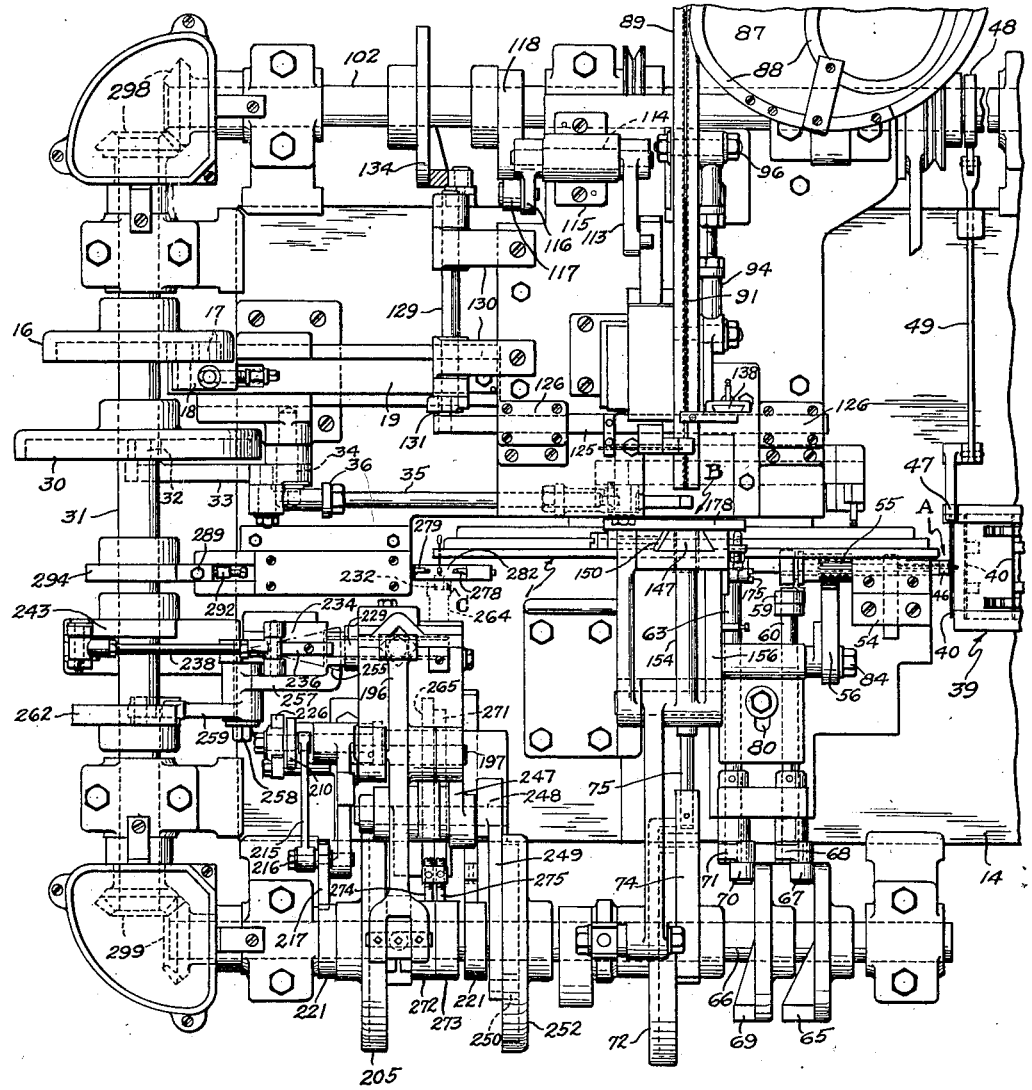
Fig. 1 is a top plan view of the main portion of the machine, the mechanism for feeding, cutting off and pointing the wire from which the pins are made being omitted as a known form of such device is employed.

The guarding mechanism is shown in Figs. 17 to 28 and its relation to the dial and the other mechanism is shown in Fig. 1. This mechanism includes means for punching the blanks for the guards from a strip of sheet metal, forming the guards, placing them on the loop 10 of the safety pin, and setting them thereon. A guard press frame 189a (Fig. 17) is mounted on the bed 14 and carries a guard press head 189 forming a guide for a vertically movable slide 190 carrying a punch 191 which cooperates with a blanking die 192. This die has a blanking opening 193 (Fig. 19), which opening and punch correspond to the shape of the guard blank 194 indicated in Fig. 25. Above the die 192 and between it and the punch is fed a strip of sheet metal 195 from which the blank is cut by the punch and die. The punch 191 and the slide 190 is reciprocated vertically in proper timed relation with the operation of the other elements by means of a lever 196 pivoted to the frame at 197, the forward end of this lever being rounded as shown at 198 to fit in suitable bearing blocks 199 mounted in the slide 190. The other end of the lever is connected by a shear pin 200 to a connecting rod 201. The lower end of this rod is connected to a forked head 202 embracing the shaft 66 and carrying a roller 203 running in a cam groove 204 in a cam 205. The rod 201 is threaded at its opposite ends in suitable clamping heads 206 so that the length of the rod may be adjusted by turning it, and after adjustment may be secured in adjusted position by clamping screws 207. The shear pin 200 is made of such a size as to be strong enough to carry the forces for ordinary operation, but should the punch mechanism jam it will shear off so as not to break any of the other mechanisms.

The feed mechanism for the metal strip 195 comprises a pair of feed rollers 208 to grip the strip above and below, and these rollers are connected by meshing gears 209 so that they are both driven. One of these gears, preferably the lower, is connected with a driving ratchet 210 which is engaged by a pawl 211 pivoted at 212 on an arm 213 swinging about the shaft 214 carrying the ratchet. As this arm 14 is swung back and forth the pawl engages the ratchet to rotate the rollers with a step by step movement to feed the strip 195 past the punch and die. The arm 213 is operated by a connecting link 215 adjustably connected at 216 to a lever 217 pivoted at 218. The connection 216 may be adjusted in the slot 219 and secured in adjusted positions to vary the throw of the link 215 and therefore the amount of feed for each operation. The lower arm of the lever 217 is curved as shown at 220 and engages a cam 221 on the shaft 66. The upper roller 208 is mounted on a pivoted bell crank 222 pivoted at 223 so as to permit the roller to move toward and from the lower roller 208 to accommodate different thicknesses of metal and also to permit the roller to be pressed against the metal strip by a spring. A spring 224 is connected at one end to the upright arm of this bell crank and at its opposite end to the frame so as to clamp the strip being fed between the two rollers and provide the necessary feeding grip. The ratchet 210 has a hub 225 which is embraced by the jaws 226 of an adjustable friction device secured at 227 to the frame. These jaws may have a lining or facing 228 of leather or other suitable material to provide suitable friction on the ratchet hub. This prevents the rollers feeding forwardly too far by momentum under action of the ratchet, and also prevents backward movement of the rollers as the feeding pawl is moved backwardly.

Figure 6:
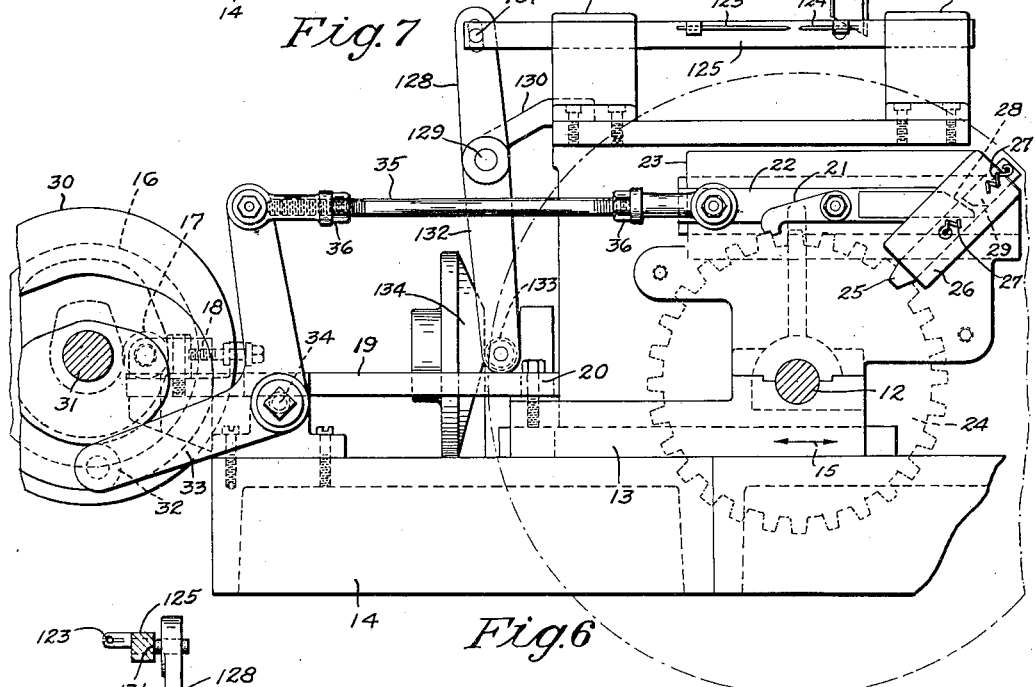
Fig. 6 is an elevation of the shifting and driving mechanism for the pin carrying dial.
Figure 8:
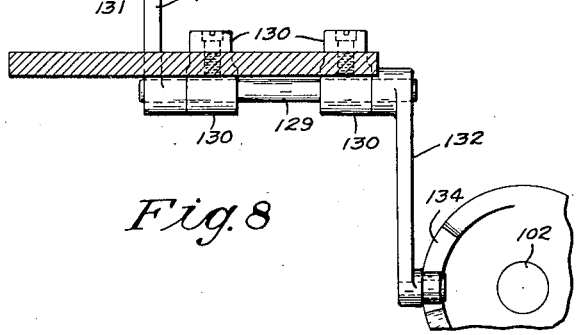
Fig. 8 is a detailed partial section and partial elevation of a part of the cap feed control, the section being substantially on line 8—8 of Fig. 7.
Figure 19:
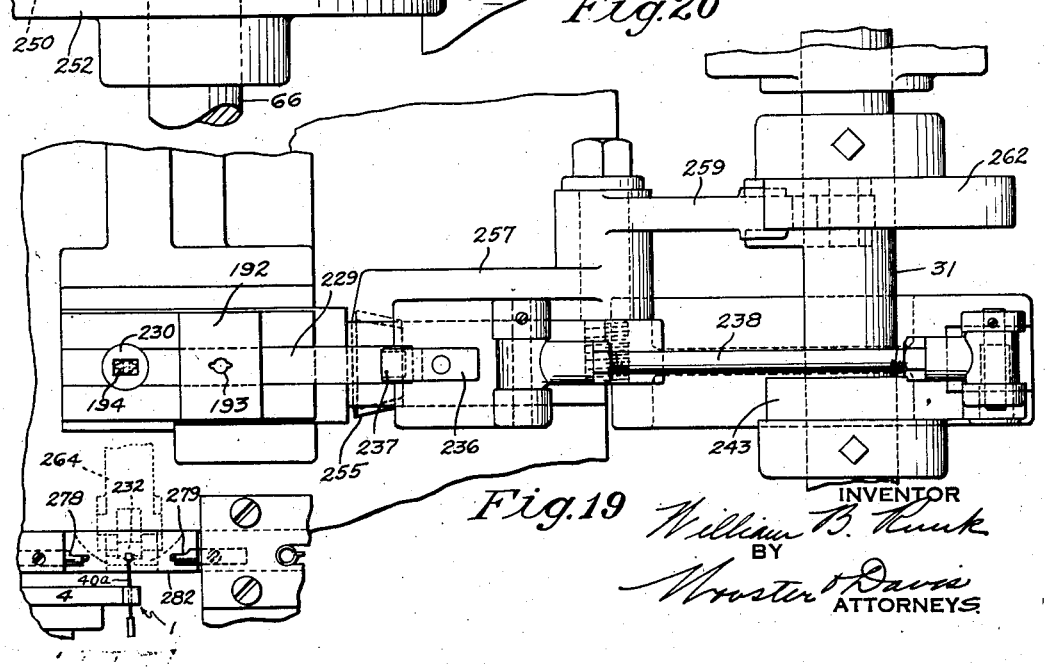
Fig. 19 is a top plan view of the guard forming and setting station and showing the mechanism for operating the guard carrying and locating mechanism.

Mounted for reciprocating movement under the die 193 is a guard carrier slide 229 which has a forming die 230 which receives the blank 194 as it is carried through the blanking die 193 and in which the blank is folded to the substantially U-shape condition of Fig. 6. This die 230 is recessed to receive the cut blank 194 from the die 193 as shown in Fig. 19 and carries it from under the die 193 to a position at the left thereof as shown in Fig. 19 under a drawing and forming punch 231, the die 230 having a rectangular opening therethrough into which the blank 194 is forced by the punch 231, the sides of this opening at the top being rounded or tapered so as to fold the opposite ends of the blank to a parallel relation and form the blank substantially U-shape as shown at 38—182, Fig. 26. This punch 231 also carries the U-shaped guard into the carrier jaws 232 of a transfer mechanism 233. The guard carrier slide 229 is reciprocated back and forth to carry the blank from the die 193 to the forming punch 231 by means of a sliding head 234 mounted to slide on the bracket 235, and to which head the slide 229 is connected by any suitable means such as a block 236 mounted on the head 234 and having a hooked end 237 extending through an opening in the slide 229. The head 234 is connected by an adjustable connecting rod 238 with a lever 239 pivoted at 240 to a bracket 241 mounted on the bed. This lever 239 carries a roller 242 running on a cam 243 on the shaft 31. A spring 244 connected at one end to the bracket 235 and at the other end to the lever 239 holds the roller 242 against the cam 243 and shifts the slide 229 forwardly when permitted to do so by the cam 243 to carry the blank from the die 193 to the drawing and forming position under the punch 231, which is also over the transfer jaws 232 when they are in the normal position.

The punch 231 is carried by a vertically movable slide 245 also mounted in the head 189 and in which it is reciprocated in proper timed relation to the operation of the punching die 191 and the carrier slide 229. This slide 245 is connected by a pin and slot connection 246 with an arm 247 mounted on a shaft 248. Also secured to the shaft is an arm 249 carrying a roller 250 running in a cam groove 251 in a cam 252 on the shaft 66.

Figures 17, 18:
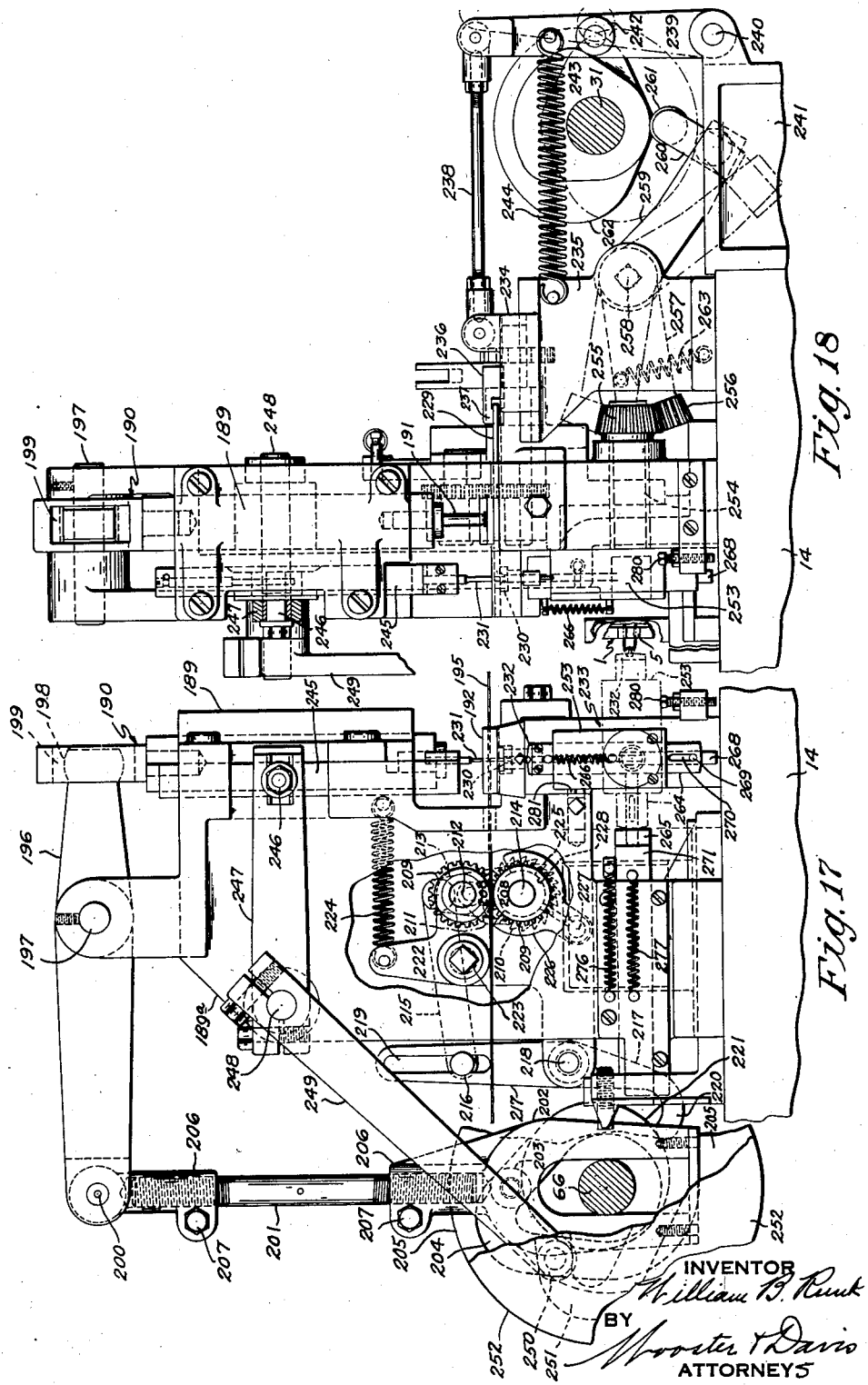
Fig. 17 is a side elevation showing the means for forming and applying the guards, parts being broken away.
Fig. 18 is a front elevation thereof.
Figure 20:
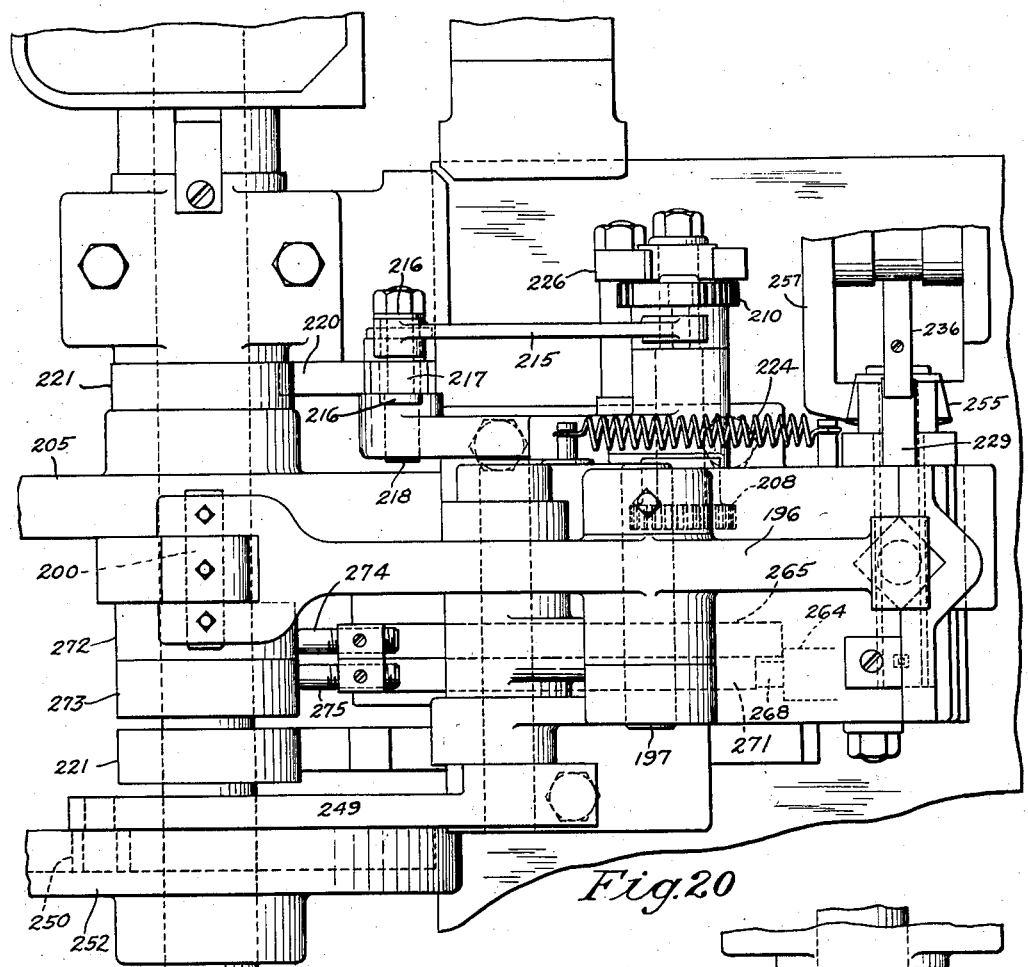
Fig. 20 is a top plan view of the mechanism for forming the guard including the operating means for the punching or forming mechanism and the guard releasing mechanism.

It will be seen from Fig. 17 that the U-shaped guard 38 is carried into the jaw 232 of the transfer device when this jaw is in the upright position, but it will be seen from Fig. 2 that the safety pin in the carrying dial 1 is in a horizontal position when the guard is applied. These jaws 232 therefore are mounted on a transfer or carrier member 253 which is pivotally mounted so as to swing from the upright full line position to the dot and dash line position of Fig. 17, or that is, from the dotted position of Fig. 21 to the full line position of this figure. For this purpose the member 253 is mounted on a shaft 254 which carries a beveled gear 255 meshing with a beveled gear segment 256. This gear segment is on one arm 257 of a bell crank lever pivoted at 258 and on the other arm 259 of which is adjustably mounted a holder 260 carrying a roller 261 running on a cam 262 on the shaft 31. This roller is held against the cam by a spring 263 secured to the arm 257 and to the bed 14 or the bracket 235, and it therefore tends to swing the member 253 to the upright position.

It will be seen that when the slide 190 and the punch 191 are moved downwardly a blank 194 (Fig. 25) is blanked or cut from the strip 195 and carries into the die 230 in the slide 229, slide 229 being retracted at this time so that the die 230 is under the die opening 193. As the punch 191 is retracted the carrier slide 229 is advanced to carry the die 230 and the blank 194 to a position under the punch 231. This punch is now operated downwardly to force the blank 194 through the die 230. This operation bends the blank to substantially the U-shape shown at 38 (Figs. 26 and 27), and this punch also carries this U-shaped blank down into the jaws 232 which at this time are located in alignment with and under the die 230 as shown in Figs. 17 and 18. The punch 231 may now be withdrawn and the carrier slide 229 retracted or shifted backwardly to carry the die 230 under the die 193 to receive the next blank, and so on.

In the mean time however the pin carrier dial 1 has been indexed to bring a capped safety pin to the position C opposite the transfer device 233. This is the position of the dial and the pin shown in full line (Figs. 21, 22 and 23), and also shown in full line (Figs. 17 and 19). The cam 262 now operates the carrier member 253 by turning the shaft 254 and thus swinging the member 253 from the upright position shown in full lines (Figs. 17 and 18), and in dotted lines (Fig. 21), downwardly to the horizontal position shown in dotted lines (Figs. 17 and 19), and full lines (Figs. 21 and 22). This movement of the member 253 carries the jaws 232 in which the blank 38 has been placed into alignment with the looped end 10 of the safety pin. This turning movement of the member 253 to the horizontal position also carries the end of the slide 264 on which the jaws 232 are mounted into alignment with the end of a slide bar 265. The slide 264 is mounted to slide longitudinally in the member 253 and is normally held in its lowermost position by a spring 266 connected to the slide and to the guide 253. Mounted to slide longitudinally within the slide 264 is an ejector pin 267 (Fig. 21), the lower end of which 268 (Figs. 17 and 21) projects from the lower end of the slide 264. This pin has limited sliding movement in the slide 264 as determined by a pin 269 carried by the slidable pin 268 and projecting into a slot 270 in the slide 264. Swinging of the member 253 to the horizontal position also carries the projecting end 268 of the ejector pin into alignment with the end of the slide bar 271. The two slide bars 265 and 271 are operated by cams 272 and 273 respectively on the shaft 66 through adjustable studs 274 and 275 (Fig. 20) mounted on the respective slide bars. They are normally retracted by means of springs 276 and 277 connected to the respective slide bars and to the guides therefor.

The jaws 232 and the U-shaped guard are now in alignment with the looped end of the safety pin in the dial 1 and the two slide bars 265 and 271 are advanced by their cams to place the U-shaped guard 38 on to the loop 10 of the safety pin as indicated in Fig. 21, the free end lugs 182 being at opposite sides of the loop 10. While the guard is held by the jaws 232 in this position a pair of punches 278 and 279 are advanced from opposite sides to press these lugs inwardly about the outer end of the loop 10 to the position shown in Fig. 28. This sets the guard and clamps it on the loop 10. As soon as this is accomplished the slide 264 and the jaws 232 are retracted or withdrawn away from the guard and the ejector pin 267 held in the advanced position for a sufficient time to free the guard from the jaws. The jaws are then retracted to the normal position away from the guarded pin and the dial 1 is free to be indexed to bring the next pin into the guarding position. As soon as the slide 264 and jaws 232 are retracted the transfer member 253 is swung from the horizontal to the upright position by the cam operated mechanism so as to receive the next guard from the die 230 and the punch 231. The movement of the member 253 to the horizontal position is limited by an adjustable stop 280 which insures that it comes to rest in proper position so that the jaws 232 and the guard are in proper alignment with the safety pin on the dial 1 on which the guard is to be placed. Another adjustable stop 281 limits movement of member 253 backwardly to the upright position so as to insure that the jaws 232 are placed in proper alignment with the die 230 and the punch 231 to receive the guard therefrom.

The guard setting punches 278 and 279 are mounted on slides 282 and 283 respectively, these slides being mounted in a guideway in a suitable bracket or head 284. These slides as shown in Figs. 22 and 23 are located one above the other and on their opposed surfaces are provided with racks 285 and 286 meshing with a gear 287. The upper slide 283 carries a block 288 adjustably mounted on the slide by a clamping screw 289 in the slot 290, and it is backed up by a set screw 291 mounted in a block 292 secured to the slide. The block 288 has a rounded nose 293 running on a cam 294 on the shaft 31. A spring 295 connected at one end at 296 to the bracket and at the other end to a stud 297 carried by the slide 283 tends to hold the two slides in their retracted position and with the punches 278 and 279 spaced away from the safety pin in the dial 1. When the rise on the cam 294 runs on to the block 288 it forces the slide 283 to the left as viewed in Fig. 23 to carry the punch 279 against the guard on the safety pin. This movement of the slide 283 through the rack 286, pinion 287, and rack 285 shifts the slide 282 and the punch 278 in the opposite direction so that the guard on the safety pin is clamped between these two punches and set on the pin.

The main drive for the machine is not shown but may be a pulley driven by a belt from any suitable source of power or it may be an electric motor drive. It is connected to the shaft 102 and this shaft through the beveled gears 298 drives the shaft 31, and similar beveled gears connecting shafts 31 and 66 drive this latter shaft. The rotatable hopper 87 is also driven by any suitable gearing from the shaft 102. It will be apparent from Fig. 1 that the various devices for pointing the wire for a safety pin bar, twisting of this bar to form the loop at the end of the pin and placing the pin in the carrier dial 1, placing and setting the cap on the pin, and the making, placing and setting of the guard on the looped end of the pin, are all placed about the dial 1. It will be noted that the cap is placed on one end of the pin on one side of the dial and the guard is placed on the looped end of the pin on the other side of the dial, and therefore after the pin bar is wound to form the loop and is placed in its holder in the carrier dial it remains in this holder during the operations of applying and setting the cap and guard, and so remains in the holder until the pin is completed. The use of the vertical carrier dial requires a minimum of space and it permits all the operating parts to be positioned in substantially rectangular relation which also requires a minimum of space, and the bodily shifting movement of the pin carrying dial to and from the twisting or winder station for forming the loop in the safety pin bar greatly facilitates the placing of this wound bar in its holder on the carrier dial, insuring positive operation and increasing production as there are minimum failures in operation.

Having thus set forth the nature of my invention, what I claim is:

1. In a machine of the character described, a work carrying dial having spaced holders for the work, working stations at different locations adjacent the dial including a station for placing work in the holder and other stations for performing different operations on the work, means for shifting the dial bodily to bring a holder into position at the first station to receive work, and means for rotating the dial to carry the work from station to station.

2. In a machine of the character described, a work carrying dial having a plurality of work holders at its periphery, a plurality of working stations adjacent the periphery of the dial including a station having means to apply work pieces to the holders and means at another station to perform different operations on the work, means for shifting the dial bodily in the plane of the dial to carry a holder to the work receiving position, and means for rotating the dial with a step by step movement to carry the work to another station.

3. In a machine of the character described, a dial mounted to turn in the plane of the dial, a plurality of spaced work holders at the periphery thereof and adapted to hold work in a position extending transversely of the dial, a plurality of working stations adjacent the dial, means at one station for inserting work in the holders, means for shifting the dial bodily in the plane of the dial to place a holder in work receiving position, means at other stations to perform different operations at the opposite ends of the work pieces, and means for indexing the dial with a step by step movement to carry the work to the different stations.

4. In a machine of the character described, an upright work carrying dial mounted to turn about a horizontal axis, a plurality of spaced work holders carried by the dial, a plurality of working stations located at different positions about the dial, means at one station for preparing work for the dial, means for shifting the dial bodily in the plane of the dial to carry a holder into position to receive a work piece from said means, means at the other stations for performing different operations on said work pieces, and means for rotating the dial with a step by step movement to carry the work from the receiving station to the other stations.

5. In a safety pin machine, a rotatable dial, a plurality of holders for wound pin bars carried by said dial, means for winding pointed pin bars to provide an intermediate loop therein, means for shifting the dial bodily to bring a holder into position to receive a wound bar from said winding means, means at different locations about said dial to apply a cap and a guard to said pin bar, and means for rotating the dial with a step by step movement to carry the bars from the winding means to the capping and guarding means.

6. In a safety pin machine, a rotatable dial, a plurality of holders for wound pin bars at the periphery of said dial, means at one side of the dial for winding pointed pin bars to form a loop therein and placing it in a holder, means for shifting the winding means to and from the winding position to place the bar in a holder, means at different locations about the dial to apply a cap to the free ends of the bars and a guard to the loop, and means for rotating the dial with a step by step movement to carry the bars from the winding mechanism to the capping and guarding means.

7. In a safety pin machine, an upright dial mounted to rotate about a horizontal axis, means at one side of the dial to wind a pin bar to provide a loop, means for feeding a pointed bar to the winding means, a plurality of holders for wound bars carried at the periphery of said dial, means for bodily shifting the dial in the plane thereof to carry a holder to a position adjacent the winding mechanism to receive a wound bar therefrom, means for retracting the winding mechanism from the winding position to release the wound pin in the holder, and means for indexing the dial.

8. In a safety pin machine, an upright dial, a plurality of holders for wound pin bars at the periphery of said dial, means for winding a pointed pin bar to form a loop, means for shifting the dial bodily in the plane thereof to carry a holder to and from the winding mechanism, means for indexing the dial with a step by step movement including a toothed ratchet, a pivoted pawl to shift the ratchet, a sliding bar on which the pawl is mounted, a locking pawl adapted to seat in the recesses between teeth of the ratchet to hold the dial in different positions, cooperating cam surfaces carried by the locking pawl and said bar to release the pawl, and means for sliding the bar.

9. In a safety pin machine, an upright dial, a plurality of holders for wound pin bars in the periphery of the dial, a winding head at one side of the dial rotatable about an axis substantially parallel to the plane of the dial, a central winder pin projecting from said head, a jaw on the head to wind a pin bar about said pin, means for shifting the dial bodily longitudinally of the head to position a holder about a wound bar in said head, means for rotating the head in timed relation with the shifting of the dial to wind and release the bar, and means for retracting the head and pin from the winding position to free the wound bar in the holder.

10. In a safety pin machine, an upright dial, a plurality of holders for wound pin bars at the periphery of the dial, means for winding a pointed pin bar and placing it in a holder to extend transversely of the dial, spaced means on opposite sides of the dial to place a cap on one end of the wound bar and a guard on the other end, means for indexing the dial with a step by step movement to carrying the holders from the winding position to the capping and guarding positions, means forwardly of the capping position to engage each wound bar to shift it laterally in its holder and in a direction lengthwise of the bar to position all the bars in the same position for capping, and means between the capping and guarding mechanism to shift each bar in the opposite direction in its holder to place all the bars in the same position for capping.

11. In a safety pin machine, a rotatable dial, a plurality of spaced holders in the periphery of the dial to hold wound pins in a position extending transversely of the dial, means on one side of the dial to place a cap on one end of the pin, means on the other side of the dial and spaced around the dial from the capping means to place a guard on the other end of the pin, means for indexing the dial to carry the pins to the capping and guarding means, an arm carrying a shoulder on one side of the dial to engage one end of the pin to shift each pin in its holder to position them all in the same position before they reach the capping means, an arm having a shoulder on the opposite side of the dial to shift each pin in its holder in the opposite direction after it leaves the capping position to place them all in the same position before they reach the guarding means, and means for operating the arms.

12. In a safety pin machine, an upright dial, a plurality of holders for wound pin bars on said dial, means at one side of the dial for placing a cap over one end of the pin, a punch movable toward the pin for setting the cap, an arm on one side of the dial to engage one end of each pin and shift the pins in the holder to place them all in the same position in the holder before they reach the capping position, an arm on the opposite side of the dial to engage the opposite end of each pin after it has been capped to shift the pin in the opposite direction to place them all in the same position in their holders, a slide for the punch, cams operated by said slide for operating said arms, means for indexing the dial to bring the pins successively to the capping position, and means for operating the slide in timed relation with the indexing.

13. In a safety pin machine, an upright dial, a plurality of holders for wound pin bars in said dial, an inclined feed chute at one side of the dial having a guide groove for caps, a transfer slide at the lower end of the chute and having a die to receive a cap from said groove, means for feeding the caps one at a time from the groove to said die, means for shifting the slide and die toward the dial to place the cap on the end of a pin in a holder, a punch arranged for setting the cap on the pin while the cap is in said die, and means for operating the punch.

14. In a safety pin machine, a rotatable dial, a plurality of holders for wound pin bars on said dial, means for winding a pointed bar to form an intermediate loop, means for bodily shifting the dial to bring a holder into position to receive a wound bar from said winding means, means adjacent the dial to blank and form a guard for the loop, means for transferring a guard from said forming means to the loops of a pin in a holder, means for setting the guard on the loop, and means for indexing the dial to carry the wound bar to the guard setting means.

15. In a safety pin machine, an upright dial, a plurality of spaced holders for wound pin bars on the dial, a station adjacent said dial having means for twisting a pointed pin bar to form a loop means for bodily shifting the dial to place the twisted bar in a holder, a station spaced from the first station having means to set a guard on the loop of the pin, means operable during movement of the dial for indexing the dial to carry the pin from the first to the second station, means adjacent the second station for cutting a guard blank and forming it, and transfer means having a holder to receive the formed guard and transfer it to the loop at the second station.

16. In a safety pin machine, an upright dial, a plurality of spaced holders for wound pin bars in the periphery of the dial, means for winding a pin bar to form a loop and placing it in a holder, means spaced from said winding means comprising a blanking punch, a die under said punch cooperating therewith to cut a guard blank, means for feeding a strip of metal between the punch and die, a sliding transfer under the die having a forming die to receive the blank from the first die, a forming punch at one side of the first punch, means for shifting the slide to carry the blank to the forming punch, a transfer device having jaws normally under the forming die in position to receive the formed guard forced therethrough by the punch, means for shifting the jaws to carry the formed guard to and place it on the loop of a pin on the dial, punches for clamping the guard to the loop, and means for rotating the dial to carry pins from the winding to the guarding position.

17. In a safety pin machine, an upright dial, a plurality of spaced holders for wound pin bars in the periphery of the dial, means for winding a pin bar to form a loop and placing it in a holder, means spaced from said winding means to set a guard on the loop, means for indexing the dial to carry the pin from the winding to the guarding position, means adjacent the guard setting means for blanking and forming a guard including a forming die and a punch for forcing the guard therethrough, a transfer device including a slide below said die having jaws to receive the blank therefrom, a pivotally mounted carrier in which said slide is mounted, means for swinging said carrier to carry a guard from the die to a position in line with a pin loop, means for advancing the slide to place the guard on the loop, said guard setting means including punches on opposite sides of the loop, means for operating said punches to clamp the guard to the loop, an ejector pin slidable longitudinally in the slide to engage the guard in the jaws, means to advance the ejector pin with the slide to place the guard on the loop, and means to retract the slide with the ejector pin advanced to free the guard from the jaws while the jaws are in alignment with the loop.

18. In a safety pin machine, an upright dial, a plurality of spaced holders for wound pin bars in the periphery of the dial, means for winding a pin bar to form a loop and placing it in a holder, means spaced from said winding means to set a guard on the loop, means for indexing the dial to carry the pin from the winding to the guarding position, means adjacent the guard setting means for blanking and forming a guard including a forming die and a punch for forcing the guard therethrough, a transfer device including a slide below said die having jaws to receive the blank therefrom, a shaft, a carrier member for said slide mounted on said shaft, an ejector pin mounted for longitudinal sliding movement in said slide, means for turning the shaft to swing the slide to carry the guard to a position in alignment with a pin loop, means for advancing the slide and ejector pin to place the guard on the loop, means for operating the guard setting means to clamp the guard to the loop, and means for retracting the slide and retaining the ejector pin advanced to release the guard while the slide is in alignment with the loop.

19. In a safety pin machine, a carrier having a plurality of holders for wound pin bars, means for winding pin bars to form a loop and placing the wound bars in the holders, means spaced from the winding means for setting guards on the loops, means for indexing the carrier to transfer pins from the winding means to the guard setting means, means adjacent the guard setting means to blank and form guards, a transfer comprising a carrier, a shaft supporting the carrier, a slide carrying jaws mounted on the carrier, an ejector means mounted in said slide, means for oscillating the shaft to shift the jaws between a position to receive a guard from the forming means and a position in alignment with a pin loop, means for shifting the slide and jaws when in the latter position to place the guard on the loop, and means for retracting the jaws and operating the ejector while the guard is on the loop to release this guard from the jaws.

20. In a safety pin machine, an upright dial, a plurality of spaced holders for wound pin bars on said dial, a plurality of stations about said dial including means for winding pin bars to form a loop, means for bodily shifting the dial to place said bars in the holders, means at other stations for applying a cap to one end of the pin and a guard to the loop, means operable during movement of the dial for indexing the dial to carry the pins from the winding to the other stations, a pair of parallel shafts on opposite sides of the dial, a third shaft extending between the first shafts, driving connections between the first shafts and the third shaft, means for driving said shafts, and means operated by said shafts for operating the winding, capping, guarding and indexing means.

21. In a safety pin machine, an upright dial, a plurality of holders in said dial for wound pin bars, means adjacent said dial for winding pointed pin bars and placing them in the holders with their ends on opposite sides of the dial, means on one side of the dial for feeding caps and applying them to one end of the pins, means on the other side of the dial for applying guards to the looped ends of the pins, means for indexing the dial to carry the pins from the winding to the capping and guarding means, a pair of shafts located one at each side of the dial, a third shaft extending transversely between the first shafts, driving connections between the third shaft and each of the first shafts, means for driving one of the shafts, and means operated from the various shafts for operating the winding, capping, guarding and indexing means.

22. In a safety pin machine, a rotatable dial, a plurality of holders for wound pin bars carried by said dial, means for winding pointed pin bars to provide an intermediate loop therein, means for shifting the dial bodily to bring a holder into position to receive a wound bar from said winding means, means at different locations about said dial to apply a cap and a guard to said pin bar, and means operable while the dial is being shifted for indexing the dial to carry the bars from the winding means to the capping and guarding means.

23. In a safety pin machine, a rotatable dial, a plurality of holders for wound pin bars carried by said dial, means for winding pointed pin bars to provide an intermediate loop therein, means for shifting the dial bodily to bring a holder into position to receive a wound bar from said winding means, means at different locations about said dial to apply a cap and a guard to said pin bar, and means operable during the shifting movement for rotating the dial with a step by step movement to carry the bars from the winding means to the capping and guarding means.

24. In a machine of the character described, a dial mounted to turn in the plane of the dial, a plurality of work holders at the periphery thereof, a plurality of working stations adjacent the dial, means at one station for inserting work in the holders, means for shifting the dial bodily in the plane of the dial to place a holder in work receiving position, means at other stations to perform different operations on the work pieces, means for indexing the dial with a step by step movement including a toothed ratchet, a pivoted pawl to shift the ratchet, a movable support on which the pawl is mounted, a locking pawl arranged to hold the dial in different positions, cooperating cam surfaces carried by the locking pawl and said support to release this pawl, and means for shifting the support.

25. In a safety pin machine, an upright dial, a plurality of holders for wound pin bars in said dial arranged to hold the bars in a position extending transversely of the dial, a carrier slide at one side of the dial having a die to hold a cap, means for feeding caps one at a time to said die, means for indexing the dial to bring the pin bars into alignment with the die, means for shifting each pin laterally in its holder and in a direction longitudinally of the bar just before being brought into alignment with the die so as to position all the pins uniformly in their holders, means for shifting the slide toward the dial to shift the die to place a cap in the die on the end of a pin in its holder, and a punch operable against said cap in the die to set it on the pin.

26. In a machine of the character described, a work carrying dial having spaced holders for the work, working stations at different locations adjacent the dial including a station for placing work in the holder and other stations for performing different operations on the work, means for shifting the dial bodily to bring a holder into position at the first station to rective work, and means operable while the dial is being shifted for rotating the dial to carry the work from station to station.

27. In a machine of the character described, a work carrying dial having a plurality of work holders at its periphery, a plurality of working stations adjacent the periphery of the dial including a station having means to apply work pieces to the holders and means at another station to perform different operations on the work, means for shifting the dial bodily in the plane of the dial to carry a holder to the work receiving position, and means operable during shifting movement of the dial for rotating the dial with a step by step movement to carry the work to another station.

28. In a machine of the character described, an upright work carrying dial mounted to turn about a horizontal axis, a plurality of spaced work holders carried by the dial, a plurality of working stations located at different positions about the dial, means at one station for preparing work for the dial, means for shifting the dial bodily in the plane of the dial to carry a holder into position to receive a work piece from said means, means at the other stations for performing different operations on said work pieces, and means operable during shifting movement of the dial for rotating the dial with a step by step movement to carry the work from the receiving station to the other stations.

WILLIAM B. RUNK.